United States Patent [19]

Dragone

[11] Patent Number: 5,467,418
[45] Date of Patent: Nov. 14, 1995

[54] FREQUENCY ROUTING DEVICE HAVING A SPATIALLY FILTERED OPTICAL GRATING FOR PROVIDING AN INCREASED PASSBAND WIDTH

[75] Inventor: Corrado Dragone, Little Silver, N.J.

[73] Assignee: AT&T IPM Corp., Coral Gables, Fla.

[21] Appl. No.: 300,005

[22] Filed: Sep. 2, 1994

[51] Int. Cl.⁶ .................................................. G02B 6/34
[52] U.S. Cl. ......................... 385/37; 385/46; 385/39; 385/24
[58] Field of Search .................... 385/37, 24, 46, 385/14, 15, 39, 27

[56] References Cited

U.S. PATENT DOCUMENTS

| | | | |
|---|---|---|---|
| 4,243,297 | 1/1981 | Elion | 350/96.15 |
| 4,482,994 | 11/1984 | Ishikawa | 370/3 |
| 4,566,753 | 1/1986 | Mannschke | 350/96.16 |
| 4,650,279 | 3/1987 | Magee | 350/96.24 |
| 4,707,062 | 11/1987 | Abe et al. | 350/96.16 |
| 4,750,802 | 6/1988 | Bhagavatula | 350/96.15 |
| 4,786,131 | 11/1988 | Mahapatra et al. | 350/96.16 |
| 4,904,042 | 2/1990 | Dragone | 350/96.16 |
| 5,002,350 | 3/1991 | Dragone | 350/96.15 |
| 5,039,993 | 8/1991 | Dragone | 343/776 |
| 5,136,671 | 8/1992 | Dragone | 385/46 |
| 5,243,672 | 9/1993 | Dragone | 385/37 |
| 5,339,157 | 8/1994 | Glance et al. | 385/46 |
| 5,367,586 | 11/1994 | Glance et al. | 385/37 |

OTHER PUBLICATIONS

"Silica–Based Single–Mode Waveguides on Silicon . . . ", N. Takato et al., *IEEE Journal of Lightwave Technology*, vol. 6, No. 6, Jun. 1988, pp. 1003–1009.
"Glass Waveguides on Silicon For Hybrid Optical Packaging", C. H. Henry et al., *Journal of Lightwave Technology*, vol. 7, No. 10, Oct. 1989, pp. 1530–1539.
"Arrayed–Waveguide Grating For Wavelength Division Multi–Demultiplexers With Nanometre Resolution", H. Takahashi et al., *Electronics Letters*, vol. 26, No. 2, 18 Jan. 1990, pp. 87–88.
"Optical Channel Wavegude Array . . . ", Boyd et al., *Optical Engineering*, vol. 19, No. 3, May/Jun. 1980, pp. 387–391.
"A Six–Channel Wavelength Multiplexer and Demultiplexer . . .", Lipson et al., *Journal of Lightwave Technology*, vol. LT–3, No. 5, Oct. 1985, pp. 1159–1163.
"New Focusing of Dispersive Planar Component Based On An Optical Phased Array", M. K. Smit, *Electronics Letters*, vol. 24, No. 7, 31 Mar. 1988, pp. 385–386.
"Monolithic InP–Based Grating Spectrometer . . . ", J. B. D. Soole et al., *Electronics Letters*, vol. 17, No. 2, Jan. 17, 1991, pp. 132–134.
"Four–Channel Integrated–Optic Wavelength Demultiplexer . . . ", A. R. Vellekoop et al., *Journal Of Lightwave Technology*, vol. 9, No. 3, Mar. 1991, pp. 310–314.

(List continued on next page.)

*Primary Examiner*—Frank Gonzalez
*Assistant Examiner*—Phan T. H. Palmer
*Attorney, Agent, or Firm*—Stuart H. Mayer

[57] ABSTRACT

An optical appliance includes at least one input waveguide and a first free space region connected to the input waveguide. A first plurality of waveguides is connected to the first free space region. An optical grating, which is connected to the first plurality of waveguides, includes a plurality of unequal length waveguides that are divided into at least three waveguide groups. Adjacent waveguides that belong to the same group have a substantially constant path length difference between them while adjacent waveguides belonging to different groups of waveguides have a path length difference between them that differs from the constant path length difference by an odd integer multiple of one-half a preselected wavelength. A second plurality of waveguides is connected to the optical grating and a second free space region is connected to he second plurality of waveguides. At least one output waveguide is connected to the second fee space region. As a result of this arrangement, this optical apparatus has a spectral efficiency which is maximized by providing a relatively wide passband and a relatively narrow channel spacing for a given crosstalk level.

10 Claims, 8 Drawing Sheets

OTHER PUBLICATIONS

"Multi/Demultiplexer for Nanometer–Spacing WDM . . .", H. Takahashi et al., Paper PD–1, Integrated Photonics Research Conference, Apr. 1991, Monterey, Calif.

"Design and Fabrication of Integrated–Optic . . .", K. Okamoto et al., *Electronics Letters,* vol. 27, No. 9, Apr. 25, 1991, pp. 774–775.

Co–Pending U.S. Patent Application Ser. No. 08/238,074 filed on May 2, 1994, entitled "Frequency Routing Device Having A Wide And Substantially Flat Passband," (C. Dragone Case 38).

5,467,418

FREQUENCY ROUTING DEVICE HAVING A SPATIALLY FILTERED OPTICAL GRATING FOR PROVIDING AN INCREASED PASSBAND WIDTH

FIELD OF THE INVENTION

This invention relates to an optical interconnection apparatus which is capable of optical switching, multiplexing, and demultiplexing functions. More particularly, this invention relates to an optical interconnection apparatus that has an increased passband width.

BACKGROUND OF THE INVENTION

Optical switching, multiplexing, and demultiplexing have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler, the outputs of which form the outputs of the switching, multiplexing, and demultiplexing apparatus. An example of such an interconnection apparatus is disclosed in U.S. Pat. Nos. 5,002,350 and 5,136,671.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port. Accordingly, these devices are referred to as frequency routing devices.

A known frequency routing device that provides a relatively wide passband between a distinct one of the input ports and a distinct one of the output ports to increase spectral efficiency is disclosed in U.S. appl. Ser. No. 238,074 entitled "Frequency Routing Device Having Wide and Substantially Flat Passband now U.S. Pat. No. 5,412,744." One limitation of this device however is that each input port is composed of two waveguides, thus limiting the total number of ports that can be provided.

SUMMARY OF THE INVENTION

In accordance with the present invention, an optical apparatus includes at least one input waveguide and a first free space region connected to the input waveguide. A first plurality of waveguides is connected to the first free space region. An optical grating, which is connected to the first plurality of waveguides, includes a plurality of unequal length waveguides that are divided into at least three groups of waveguides. Adjacent waveguides that belong to the same group have a substantially constant path length difference between them while adjacent waveguides belonging to different groups of waveguides have a path length difference between them that differs from the constant path length difference by an odd integer multiple of one-half a preselected wavelength. A second plurality of waveguides is connected to the optical grating and a second free space region is connected to the second plurality of waveguides. At least one output waveguide is connected to the second free space region. In one particular embodiment of the invention the transmission coefficient contributions in two of the groups of waveguides have a predetermined phase that is opposite to the phase of the transmission coefficient contributions in the remaining group of waveguides.

One advantage of the optical apparatus of the present invention is that spectral efficiency is maximized by providing a relatively wide passband and a relatively narrow channel spacing for a given crosstalk level, thus reducing the unused portion of the spectrum between adjacent passbands.

DETAILED DESCRIPTION

Figure 1:
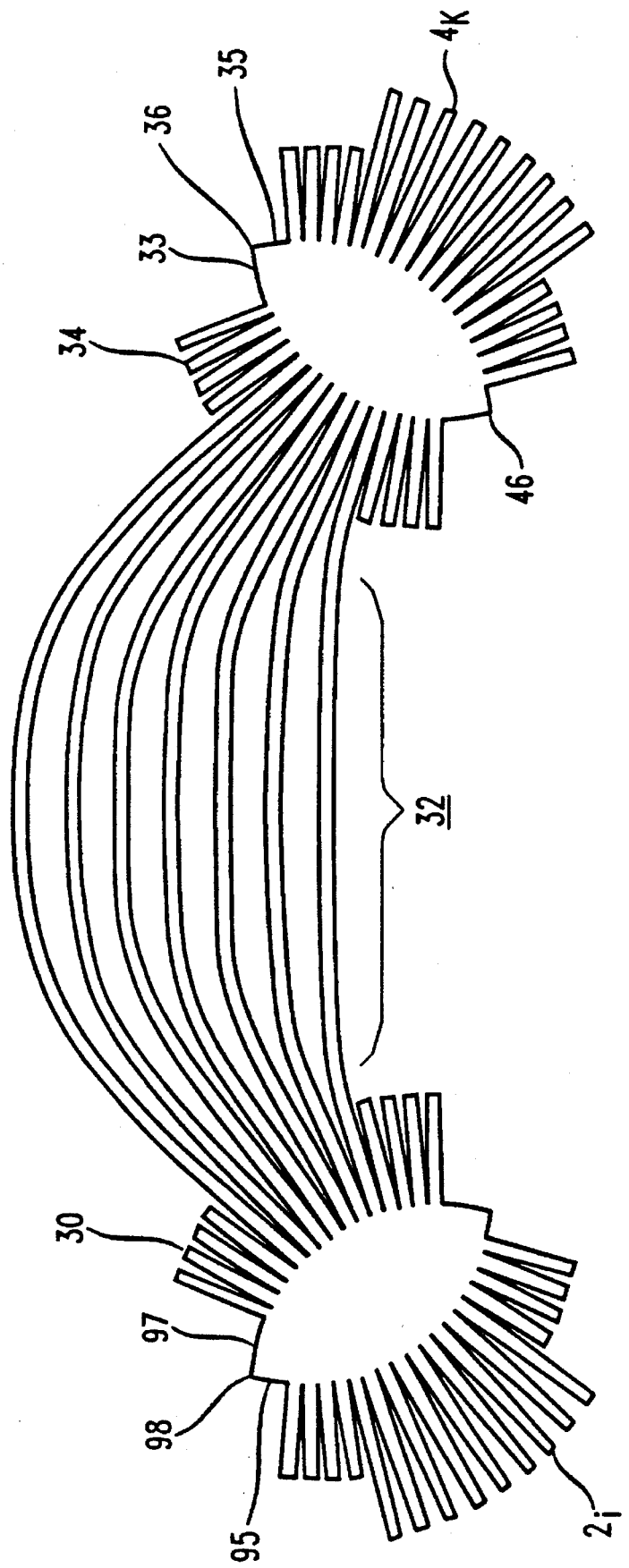
FIG. 1 illustrates an example of a conventional optical frequency routing device.

FIG. 1 shows the pertinent details of a conventional frequency routing device. The frequency routing device contains a plurality of input ports $2_i$, i=1, 2, ..., N connected to the input circle 95 of a free space region 98. A plurality of output waveguides 30 extends from the output circle 97 of the free space region 98 and is connected to an optical grating 32. The optical grating 32 comprises a plurality of unequal length waveguides or arms which provides a predetermined amount of path length difference to a corresponding plurality of input waveguides 34 connected to the input circle 33 of another free space region 46. The output circle 35 of the free space region 46 is connected to a plurality of output ports $4_k$, k=1, 2, ..., N. The various input and output ports are formed from waveguides. These frequency routing devices operate as multiplexers and demultiplexers of optical frequencies. For example, if a signal of amplitude A is applied to input port 2 then signals of amplitudes $AT_{11}, AT_{12}, \ldots AT_{1N}$ are produced at the output ports, where $T_{ik}$ is the value of the transmission coefficient for input port $2_i$ and output port $4_k$. Additional details concerning these routing devices are found in the above-referenced patents.

Figure 2:
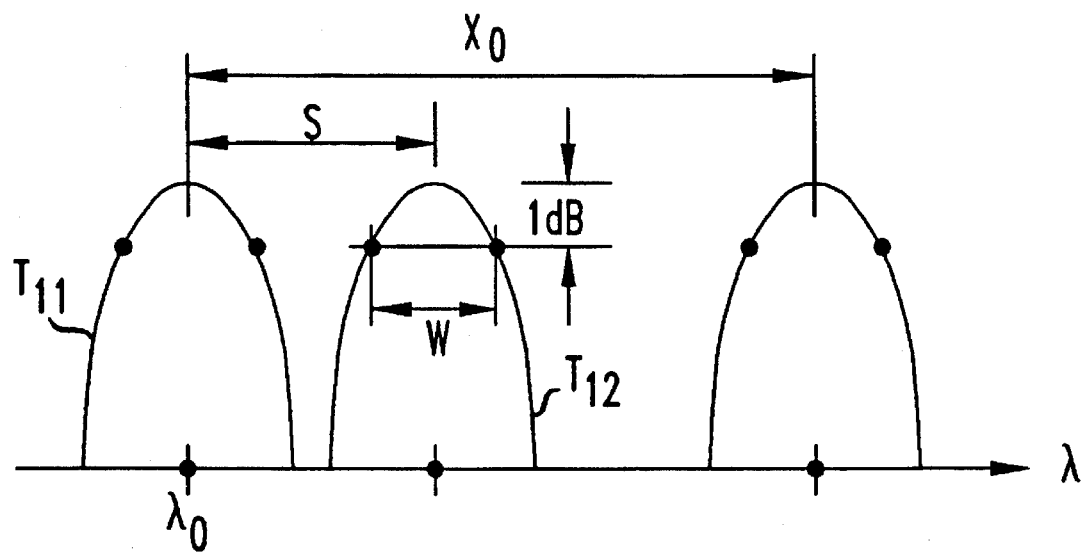
FIG. 2 is a graph showing the transmission coefficients $T_{ik}$ for the routing device of FIG. 1.

The typical behavior of the routing device shown in FIG. 1 is illustrated in FIG. 2. This figure shows the set of transmission coefficients $T_{1k}$ for the routing device for the particular input port $2_1$ as a function of wavelength $\lambda$. The channel spacing S indicated in FIG. 2 is defined as the wavelength separation between maximum peaks of adjacent transmission coefficients. The variation of each transmission coefficient as a function of wavelength is essentially periodic with a period $X_o$, which is often referred to as the free spectral range of the device. The wavelengths $\lambda_o, \lambda_k, \ldots, \lambda_k$ of maximum transmission for each of the transmission coefficients are referred to as the center wavelengths. The transmission coefficients are substantially equal to unity at the center wavelengths if certain inherent losses are taken into account. These inherent losses include waveguide losses due to fabrication imperfections and losses that arise because only a fraction of the input power is in general transferred to the arms of the grating. In particular, the transmission coefficient will be equal to unity if wavelength independent losses are added thereto. These losses do not alter the principles upon which the present invention is based and hence they will be neglected in the discussion below.

In a conventional routing device the channel spacing S is chosen to be large enough to ensure negligible crosstalk between different waveguide ports. Thus, in the vicinity of a particular wavelength of maximum transmission such as $\lambda_o$ in FIG. 2, for a particular coefficient $T_{ik}$, all other coefficients $T_{ik}$ are negligible. In other words, the various coefficients $T_{ik}$ are typically designed to be essentially non-overlapping, as in FIG. 2. However, while it is advantageous to prevent adjacent transmission coefficients from overlapping, it is also important to maximize spectral efficiency by maximizing the ratio between the passband width W and the channel spacing S so as to minimize the gap S-W, which defines the unused gap between adjacent passbands.

Figure 3:
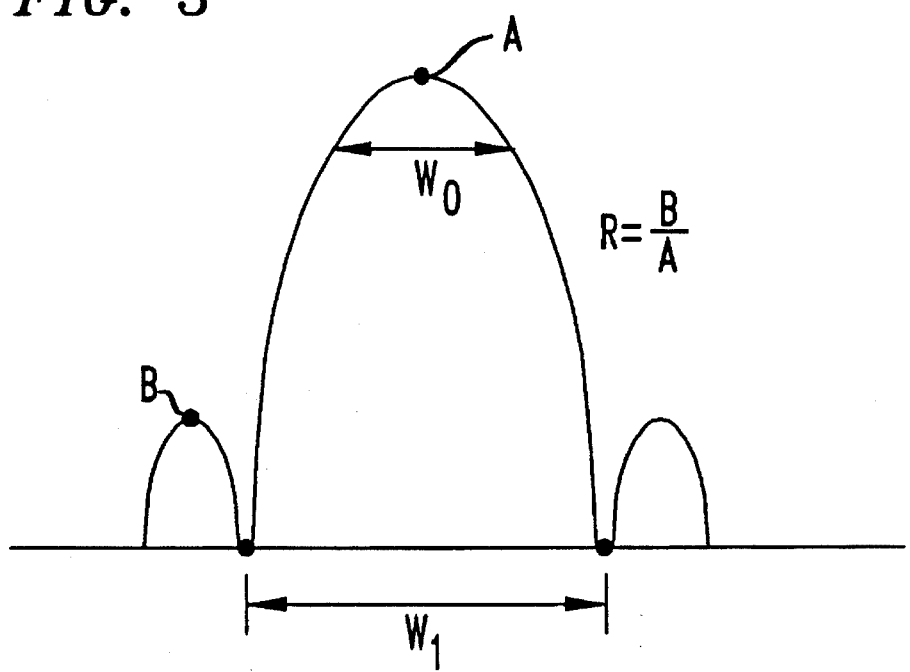
FIG. 3 is a graph showings an expanded view of one of the transmission coefficients shown in FIG. 2.

FIG. 3 shows in greater detail one of the transmission coefficients shown in FIG. 2. The transmission coefficient is characterized by a main lobe having a maximum amplitude A and a pair of sidelobes each having a maximum amplitude B that is substantially less than the amplitude of the main lobe. The ratio B/A, denoted by R, defines the maximum cross-talk of the device. For a conventional frequency routing device the value of the crosstalk R is appreciably smaller than −15 db. If the passband width $W_o$ is defined as the width of the main lobe over which the transmission coefficient variation is less than 1 db and if the main lobe width $W_1$ is defined as the width of an interval encompassing the main lobe at the edges of which the transmission coefficient falls to a specified level (e.g., zero, as in FIG. 3), the shape of the main lobe is typically such that $$w_1 \approx 4w_o \tag{1}$$

Figure 4:
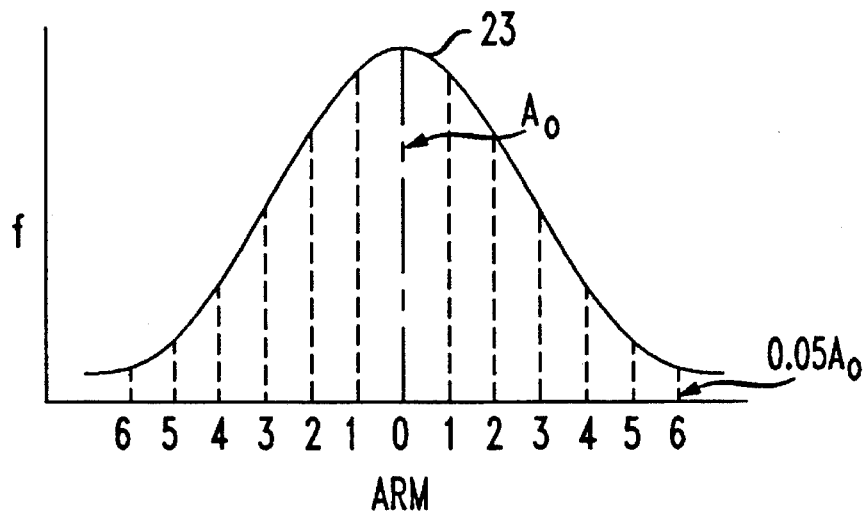
FIG. 4 shows the values of the transmission coefficient contributions distributed among the arms of the optical grating of a conventional frequency routing device.

FIG. 4 shows typical values of the transmission coefficient contributions as distributed among the arms of the optical grating of a conventional frequency routing device. The transmission coefficient contributions are determined at a wavelength of maximum transmission. The abscissa in FIG. 4 denotes the arms of the grating, where the point labeled zero corresponds to the central arm of the grating, the points labeled one correspond to the two arms adjacent to the central arm, etc. The distribution of these transmission coefficient contributions among the entire optical grating, which is indicated in FIG. 4 by the curve 23, will be referred to as the grating distribution denoted by the function f. In all cases the grating distribution f is determined at a wavelength of maximum transmission. The Fourier transform of the grating distribution f yields the transmission coefficient T as a function of wavelength such as shown in FIG. 3o The particular grating distribution f shown in FIG. 4 yields a transmission coefficient with a very low crosstalk value R. Since in FIG. 4 the value of the grating distribution f is always positive, the transmission coefficient contributions are all in phase with respect to one another.

Figure 5:
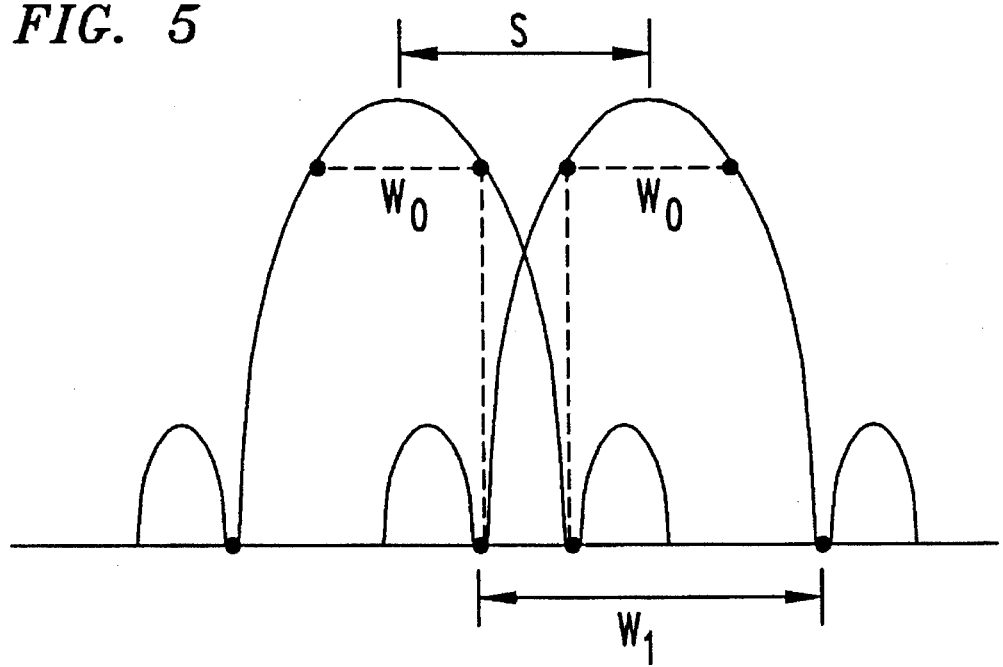
FIG. 5 shows two adjacent transmission coefficients and their respective sidelobes.

FIG. 5 shows the transmission coefficients corresponding to two adjacent output ports and their respective sidelobes, separated by a channel spacing S. As one of ordinary skill in the art will recognize, the channel spacing can be varied by varying the separation between adjacent output ports of the frequency routing device. As noted above, to maximize the spectral efficiency of the device, it is desirable to minimize the value of the channel spacing S without causing appreciable crosstalk between adjacent passband channels. The minimum value of S satisfying this condition is approximately equal to $$S = (W_o + W_1)/2 \tag{2}$$

This value of S is obtained by reducing the channel spacing S until an edge of the passband (as defined by the passband width Wo) of one transmission coefficient coincides with one of the edges of $W_1$ of the other transmission coefficient, as indicated in FIG. 5 by the vertical dashed lines. This condition yields negligible crosstalk between adjacent passbands because the passbands do not overlap. Furthermore, the only overlap occurs between the portion of the main lobe lying outside the passband of one transmission coefficient and a side lobe of the adjacent transmission coefficient. Since the value of R is small, this overlap yields negligible crosstalk. For a conventional frequency routing device, equations (1) and (2) show that $$S > 2.5 W_o \tag{3}$$

This value is too large for many applications and thus it is advantageous to minimize the channel spacing to passband width ratio $S/W_o$. To alter this ratio, which amounts to changing the functional relationship between the transmission coefficients $T_{ik}$ and the wavelength, the amplitudes and phases of an optical signal propagating in the arms of the optical grating must be altered. In other words, to reduce the ratio $S/W_o$ it is necessary to optimize the grating distribution (i.e., the distribution of transmission coefficient contributions among the arms of the grating). While it is difficult in practice to fully optimize the grating distribution, the optimal value of the ratio $S/W_o$ for a given crosstalk level can be approximated in the manner set forth below.

Figure 6:
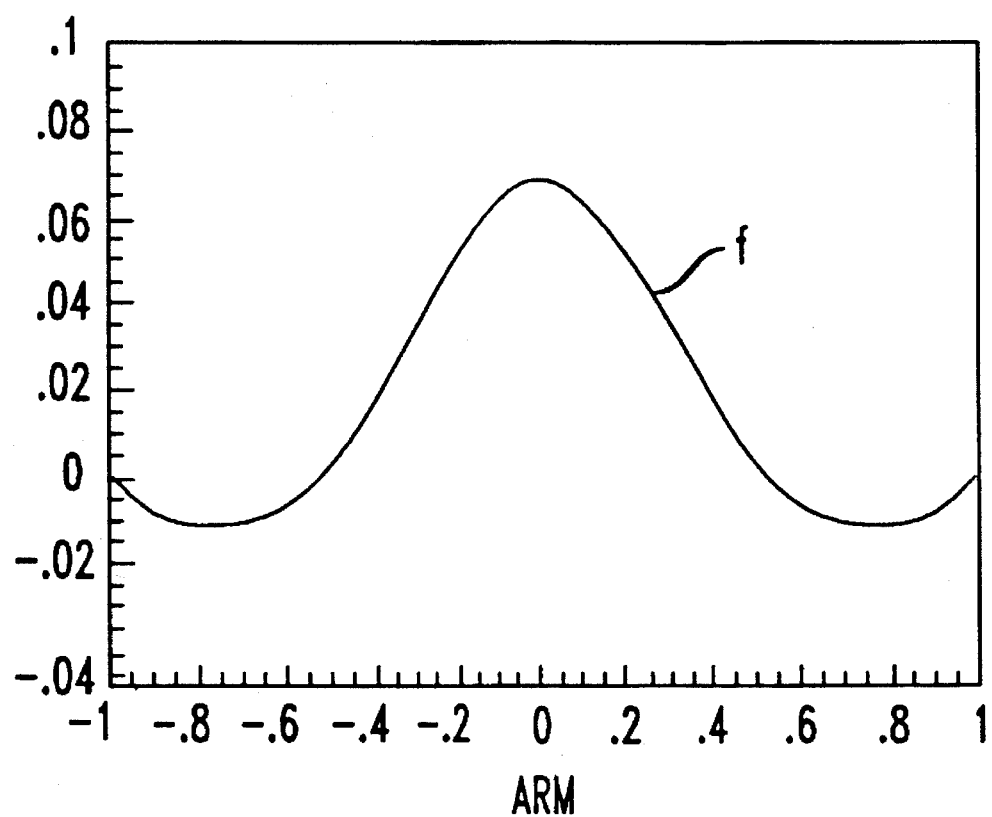
FIG. 6 shows an example of the grating distribution of an optical grating in accordance with the present invention.

In accordance with the present invention, it has been determined that in order to obtain $S/W_o < 1.8$ the grating distribution f must have two portions that are opposite in phase relative to the remainder of the grating distribution. FIG. 6 shows an example of such a distribution in which a positive-valued portion of the distribution is located in the centralmost arms of the grating and two negative-valued portions are located in the outermost arms of the grating. It should be noted that as used herein the terms "negative-valued portion" and "positive-valued portion" are relative terms used to denote the phase of the transmission coefficient contributions in a given portion of the grating distribution relative to the phase in another portion.

The grating distribution shown in FIG. 6 differs from the conventional grating distribution shown in FIG. 4 which, as noted above, is always positive in value and hence has transmission coefficient contributions that are all in phase relative to one another. The particular grating distribution f shown in FIG. 6 produces a relatively small value for the ratio $S/W_o$ (i.e., about 1.5) with a maximum efficiency for R=0.001 (−30 db). In this particular case the number of arms M in the grating is large and the grating distribution f is given by $$f(i) = 1 + 2 \sum_1^4 g_m \cos(\chi_m \eta_i)$$

where f(i) denotes the value of the grating distribution f in the ith arm of the grating, $$\eta_i = \frac{2i - (M+1)}{M-1}$$

and g1=0.80765, X1=4.1671
g2=0.06845, x2=9.12078
g3=−0.022508, x3=10.99557
g4=0.000195, x4 =14.97890

The two negative-valued portions of the grating distribution f reduce the value of maximum transmission through the device by a factor $$C = \left| \frac{\Sigma f(i)}{\Sigma |f(i)|} \right|^2$$

Clearly, the transmission loss is zero (i.e., C=1) when all the contributions to f are positive, as is the case for the conventional grating distribution shown in FIG. 4. On the other hand, for the grating distribution shown in FIG. 6, the value of C is reduced to 0.48, causing a loss of 3.19 dB. More generally, for R=0.001 (−30 dB) the loss varies between about 3 dB and 1.0 db and the ratio $S/W_o$ varies between about 1.35 and 1.6.

Figure 7:
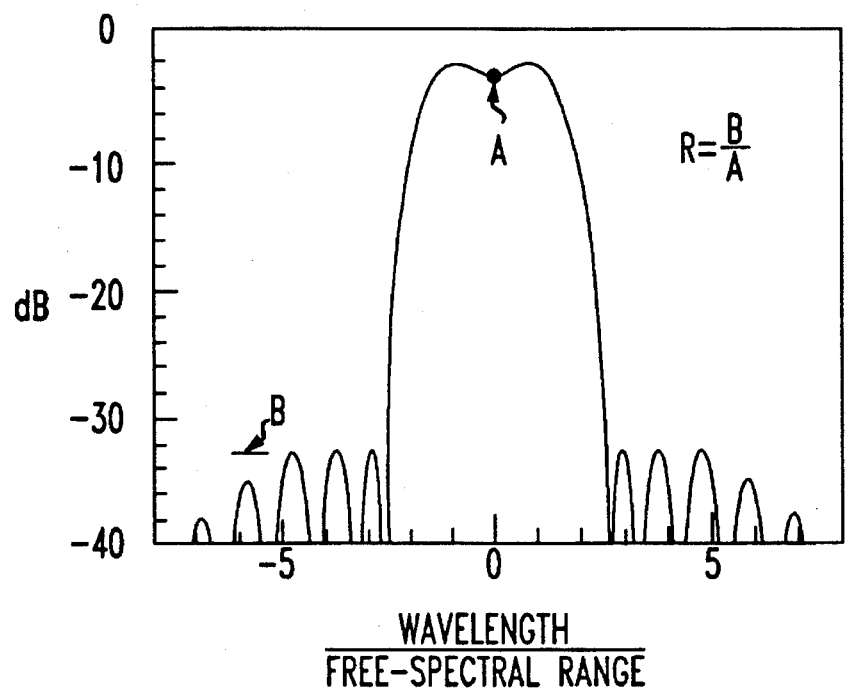
FIG. 7 shows the transmission coefficient resulting from the grating distribution shown in FIG. 6.

The transmission coefficient resulting from the Fourier transform of the grating distribution of FIG. 6 is illustrated in FIG. 7. As FIG. 7 indicates, the ratio $W_1/W_o$ and the maximum amplitude of the main lobe have both decreased (by −3.187 db in the case of the amplitude) and the amplitude at the edges of the main lobe has increased. A finite number of sidelobes (three) have the specified value for the crosstalk R. Thus, while the negative-valued portions of the grating distribution cause some loss at the center of the passband, they also cause increased transmission at the passband edges, improving the overall flatness of the passband.

Figure 8:
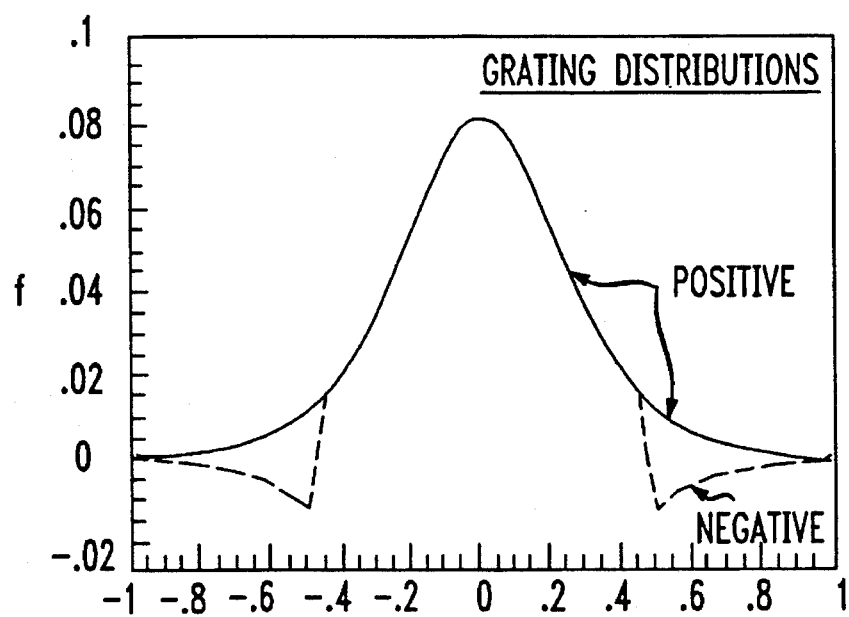
FIG. 8 shows a grating distribution for a conventional routing device (solid line) and a grating distribution in accordance with the present invention (solid line as modified by dashed line).
Figure 9:
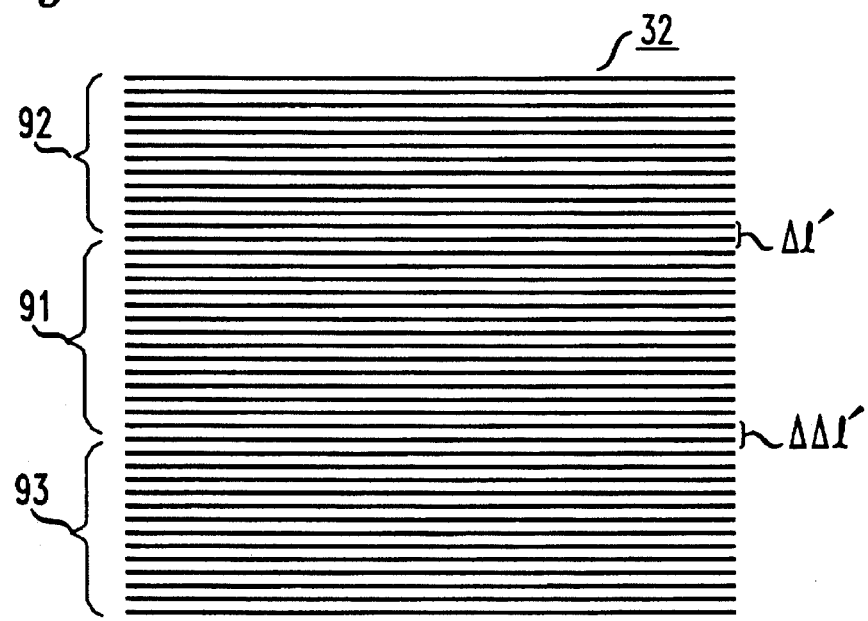
FIG. 9 shows one embodiment of the optical grating constructed in accordance with the present invention.

A grating distribution having two negative-valued portions such as shown in FIG. 6 can be produced from a conventional optical grating by increasing (or decreasing) the length of certain of the arms of the optical grating by an odd integer multiple of either one-half the center wavelength or one-half a wavelength chosen from within the wavelength range of interest. For example, the curve indicated by the solid line in FIG. 8 shows a grating distribution f of a conventional routing device having 41 arms in its optical grating. This distribution may be altered in accordance with the present invention so that it has two negative-valued portions in the outermost arms of the grating. The negative-valued portions, indicated by the dashed lines in FIG. 8, each encompass 18 arms of the grating. FIG. 9 shows the 41 arms of the optical grating divided into three groups. The centralmost arms are denoted by reference numeral 91 and the two outermost groups of arms are denoted by reference numerals 92 and 93. Adjacent arms belonging to the same group all have a constant path length difference Δl between them. Moreover, the constant path difference Δl is the same for all three groups. However, adjacent arms that belong to two different groups have a path length difference of Δl' between them. Accordingly, in FIG. 9, the pair of adjacent arms which includes an arm from group 91 and an arm from group 92 have a path length difference of Δl' between them. Similarly, the pair of adjacent arms which includes an arm from group 91 and an arm from group 93 also have a path length difference of Δl' between them. As noted above, the relationship between Δl and Δl' is as follows:

Δl'=Δl±Nλ/2 where N is an odd integer

Figure 10:
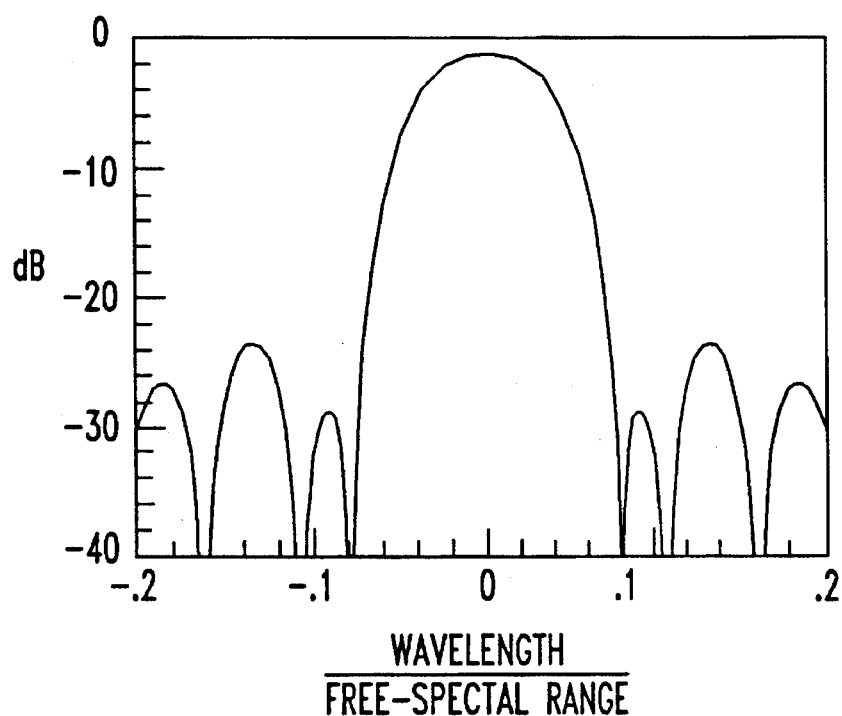
FIG. 10 shows the transmission coefficient resulting from the grating distribution (dashed line) shown in FIG. 8.

FIG. 10 shows the transmission coefficient produced by the grating distribution of FIG. 8 as modified to include the negative-valued portions. As expected, the transmission coefficient is relatively wide in comparison to the width that would have resulted from a grating distribution in which all the transmission coefficient contributions are in phase (i.e., a grating distribution that is entirely positive in value). However, the transmission coefficient has relatively large sidelobes, which adversely effects the crosstalk. These large sidelobes are caused by the discontinuities in the grating distribution that occur at the points where the grating distribution changes phase (see FIG. 8). To reduce the amplitude of the sidelobes, it is necessary to reduce the discontinuities in the grating distribution.

A number of techniques may be used to reduce or eliminate the discontinuities in the grating distribution at the points where the negative-valued portions meet the positive-valued portion. For example, assuming for simplicity that the routing device is symmetric, the value of the transmission coefficient contribution for a given arm is determined by the power transferred to that arm from a particular input port. Accordingly, in principle, any desired grating distribution can be approximately produced by configuring the input waveguide ports so as to transfer the appropriate power distribution among the arms of the grating. Alternatively, a routing device constructed in accordance with the present invention as described above, which produces a grating distribution having discontinuities, may be modified by intentionally introducing a predetermined amount of loss to certain of the arms. The latter approach is advantageous in spite of the loss because with the former approach it is generally difficult to produce a grating distribution having two negative-valued portions with negligible discontinuities. Nevertheless, the present invention contemplates the use of either approach or a combination thereof to achieve the desired grating distribution which is essentially free of discontinuities. A combination of the two techniques may be advantageous because the power loss that must be introduced is reduced.

Figure 11:
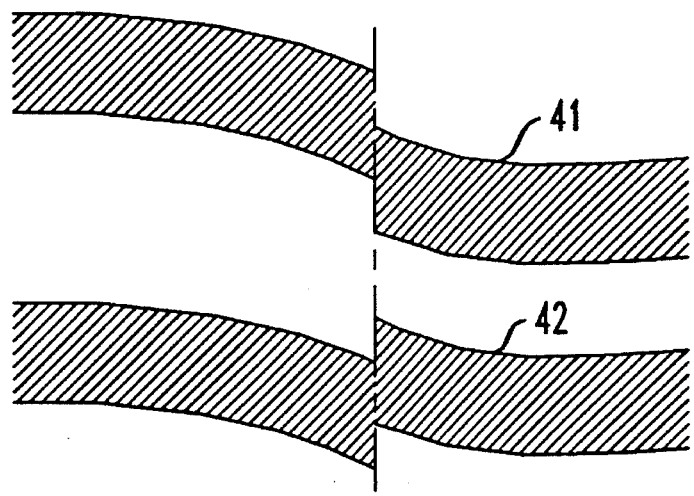
FIG. 11 shows two adjacent arms of the optical grating in which optical loss is introduced by forming each arm from laterally displaced waveguide segments.
Figure 12:
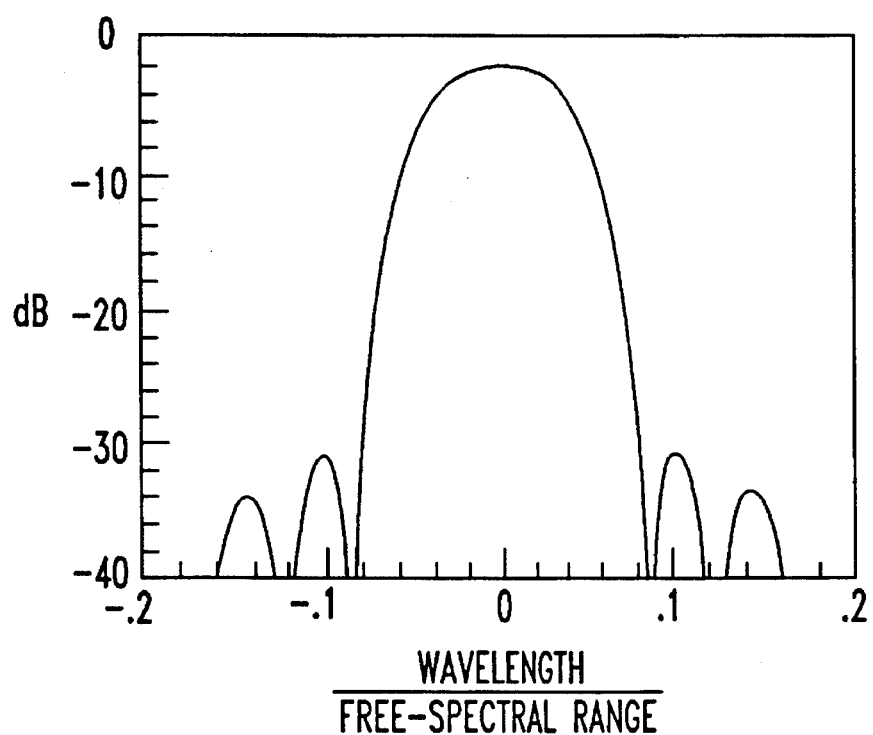
FIG. 12 shows an example of the transmission coefficient produced by introducing a predetermined amount of loss to certain arms of the optical grating.
Figure 13:
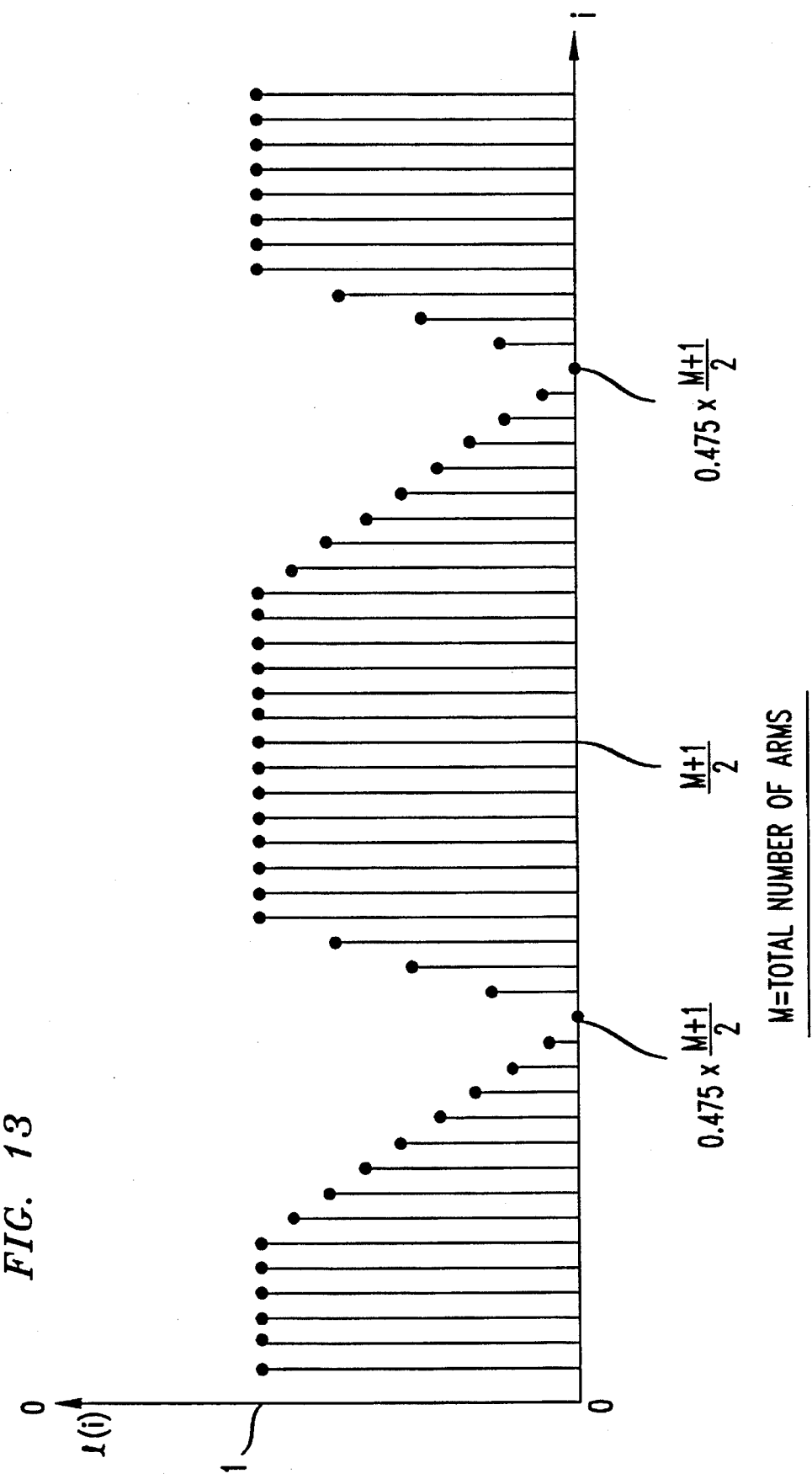
FIG. 13 shows one example of the loss coefficient that determines the amount of optical loss to be provided to the arms of the optical grating.

To provide a continuous grating distribution, the predetermined amount of loss is introduced into a predetermined number of arms that encompass and immediately surround the discontinuity. The loss can be provided, for example, by forming each arm from two waveguide sections that are laterally displaced from one another by a predetermined amount such as shown in FIG. 11 for two adjacent arms 41 and 42. The degree of displacement, which can be precisely controlled, determines the loss produced in that arm. FIG. 12 shows an example of the transmission coefficient produced by this technique. As the figure illustrates, the sidelobes have been significantly reduced. FIG. 13 shows the amount of loss that was introduced in the arms of the grating to obtain the transmission coefficient of FIG. 12. The loss coefficient l(i) is defined such that $$f'(i) = f(i) \times l(i)$$

where f(i) is the initial grating distribution that includes the discontinuities and f'(i) is the grating distribution after the discontinuities have been reduced by introducing loss in accordance with the loss coefficient l(i).

I claim:

1. An optical apparatus comprising:

at least one input waveguide;

a first free space region connected to the at least one waveguide;

a first plurality of waveguides connected to the first free space region;

an optical grating connected to the first plurality of waveguides comprising a plurality of unequal length waveguides;

a second plurality of waveguides connected to the optical grating;

a second free space region connected to the second plurality of waveguides; and at least one output waveguide connected to the second free space region; and wherein said optical grating has a grating distribution representing a distribution of transmission coefficient contributions among the plurality of waveguides of the optical grating as determined at a wavelength of maximum transmission, said grating distribution having two intervals in which the transmission coefficient contributions have a predetermined phase that is opposite to the phase of the transmission coefficient contributions in a remaining portion of the optical grating distribution.

2. The optical apparatus of claim 1 wherein said two intervals each correspond to preselected ones of the unequal length waveguides of the optical grating, said preselected waveguides being substantially symmetrically disposed about a a centralmost group of the unequal length waveguides of the optical grating.

3. The optical apparatus of claim 2 wherein said two intervals and said remaining interval form a grating distribution that is a substantially continuous function.

4. The optical apparatus of claim 1 wherein said grating distribution produces a maximum crosstalk that is below a predetermined value.

5. An optical apparatus comprising:

at least one input waveguide;

a first free space region connected to the at least one waveguide;

a first plurality of waveguides connected to the first free space region;

an optical grating connected to the first plurality of waveguides comprising a plurality of unequal length waveguides that are divided into at least three groups of waveguides, wherein adjacent waveguides belonging to a common one of said groups have a substantially constant path length difference therebetween, and adjacent waveguides belonging to different ones of said groups of waveguides have a path length difference therebetween that differs from said constant path length difference by an odd integer multiple of one-half a preselected wavelength;

a second plurality of waveguides connected to the optical grating;

a second free space region connected to the second plurality of waveguides; and at least one output waveguide connected to the second free space region.

6. The apparatus of claim 5 wherein said preselected wavelength is a wavelength of maximum transmission.

7. The apparatus of claim 5 wherein preselected waveguides in said three groups of waveguides have a predetermined amount of optical loss for producing a predetermined level of crosstalk.

8. The apparatus of claim 7 wherein said preselected waveguides each include two waveguide segments laterally displaced with respect to one another by a predetermined amount for providing the predetermined amount of optical loss.

9. The apparatus of claim 5 wherein selected ones of the unequal length waveguides of the optical grating each include two waveguide segments laterally displaced with respect to one another by a preselected amount for providing sufficient optical loss to achieve a predetermined level of cross-talk.

10. The apparatus of claim 9 wherein the predetermined amount of optical loss provides a distribution of transmission coefficient contributions among said unequal length waveguides of the optical grating that is a substantially continuous function.

* * * * *